(12) United States Patent
Dapino et al.

(10) Patent No.: US 12,630,113 B2
(45) Date of Patent: May 19, 2026

(54) BAYONET COUPLER AND VEHICLE OCCUPANT RESTRAINT SYSTEM FOR USE THEREIN

(71) Applicant: Ohio State Innovation Foundation, Columbus, OH (US)

(72) Inventors: Marcelo Dapino, Columbus, OH (US); Leon Headings, Columbus, OH (US); Vivek Srinivas, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 82 days.

(21) Appl. No.: 18/237,709

(22) Filed: Aug. 24, 2023

(65) Prior Publication Data

US 2024/0101064 A1 Mar. 28, 2024

Related U.S. Application Data

(60) Provisional application No. 63/400,509, filed on Aug. 24, 2022.

(51) Int. Cl.
*B60R 22/30* (2006.01)

(52) U.S. Cl.
CPC .................................... *B60R 22/30* (2013.01)

(58) Field of Classification Search
CPC ... A44B 11/18; A44B 11/25; Y10T 24/45225; B60R 22/30
See application file for complete search history.

(56) References Cited

U.S. PATENT DOCUMENTS

| | | | |
|---|---|---|---|
| 3,751,727 A | 8/1973 | Shepard et al. | |
| 4,307,954 A | 12/1981 | Ludwig | |
| 4,659,203 A | 4/1987 | Niwa et al. | |
| 5,253,394 A * | 10/1993 | Morita | A41F 1/002 24/658 |
| 6,871,876 B2 * | 3/2005 | Xu | A44B 11/2553 280/801.1 |
| 2003/0188400 A1 * | 10/2003 | Turner | A44B 11/10 24/68 SB |

(Continued)

OTHER PUBLICATIONS

Bayonet mount. Wikipedia. https://en.wikipedia.org/wiki/Bayonet_mount accessed 2021.

(Continued)

*Primary Examiner* — Toan C To
(74) *Attorney, Agent, or Firm* — Meunier Carlin & Curfman LLC

(57) ABSTRACT

A bayonet connector device including a female coupler including an annular wall defining a female coupler opening and a central axis, and a plurality of female coupler engagement structures extending radially inward from the annular wall toward the central axis, and a male coupler sized to be received within the female coupler opening and including a plurality of male coupler engagement structures shaped to mesh with the female coupler engagement structures. The female coupler engagement structures and the male coupler engagement structures define an inner length in an axial direction parallel with the central axis, and an outer length in the axial direction at a position radially farther away from the central axis than the inner length. The outer length is greater than the inner length.

10 Claims, 13 Drawing Sheets

(56) References Cited

U.S. PATENT DOCUMENTS

| | | | |
|---|---|---|---|
| 2013/0200195 A1* | 8/2013 | Ono | B60R 22/40 |
| | | | 242/382 |
| 2015/0042136 A1* | 2/2015 | Rajasingham | B60N 2/01575 |
| | | | 280/805 |
| 2016/0374436 A1* | 12/2016 | Park | A44B 11/266 |
| | | | 24/615 |
| 2020/0247351 A1* | 8/2020 | Kennair, Jr. | B60R 22/18 |
| 2020/0290557 A1* | 9/2020 | Wang | B60R 22/30 |
| 2021/0128374 A1* | 5/2021 | Esteireiro | B60R 22/30 |

OTHER PUBLICATIONS

General Motors announces first center mounted airbags. By Bob Yirka , Phys.org. 2011. https://phys.org/news/2011-10-motors-center-mounted-airbags-video.html.

Rouhana, Stephen W., et al. Biomechanics of 4-point seat belt systems in frontal impacts. No. 2003-22-0017. SAE Technical Paper, 2003.

King, Daniel R., et al. "Creating gecko-like adhesives for "real world" surfaces." Advance d Materials 26.25 (2014): 4345-4351.

Gorb, S., et al. "Biomimetic mushroom-shaped fibrillar adhesive microstructure." Journal of The Royal Society Interface 4.13 (2007): 271-275.

Glick, P., Suresh, S.A., Ruffatto III, D., Cutkosky, M.R., Tolley, M.T., and Parness, A. "A soft robotic gripper with gecko-inspired adhesive," Robotics and Automation Letters. 2018. doi: 10.1109/LRA.2018.2792688.

Das, S., Cadirov, N., Chary, S., Kaufman, Y., Hogan, J., Turner, K.L., and Israelachvili, J.N., "Stick-slip friction of gecko-mimetic flaps on smooth and rough surfaces" Journal of The Royal Society Interface, Jan. 14, 2015. DOI:10.1098/rsif.2014.1346.

Lee, Jongho, et al. "Sliding-induced adhesion of stiff polymer microfibre arrays. I. Macroscale behaviour." Journal of The Royal Society Interface 5.25 (2008): 835-844.

Cai, Jianguo, Yixiang Xu, and Jian Feng. "Kinematic analysis of Hoberman's Linkages with the screw theory." Mechanism and Machine Theory 63 (2013): 28-34.

Patel, Jiten, and G. K. Ananthasuresh. "A kinematic theory for planar Hoberman and other novel foldable mechanisms." International Design Engineering Technical Conferences and Computers and Information in Engineering Conference. vol. 42568. 2006.

Singh, Puneet, and G. K. Ananthasuresh. "A compact and compliant external pipe-crawling robot." IEEE Transactions on Robotics 29.1 (2012): 251-260.

* cited by examiner

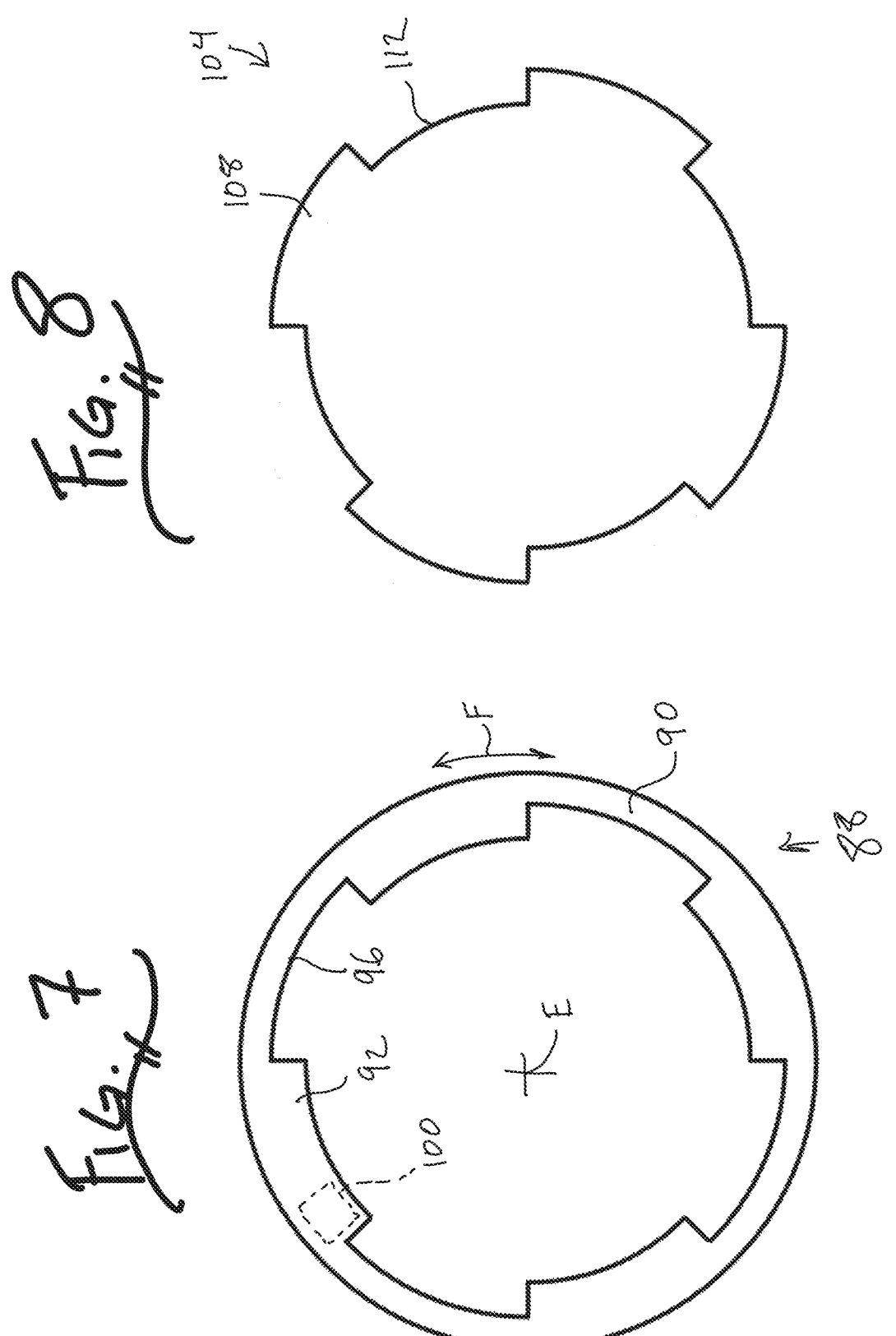

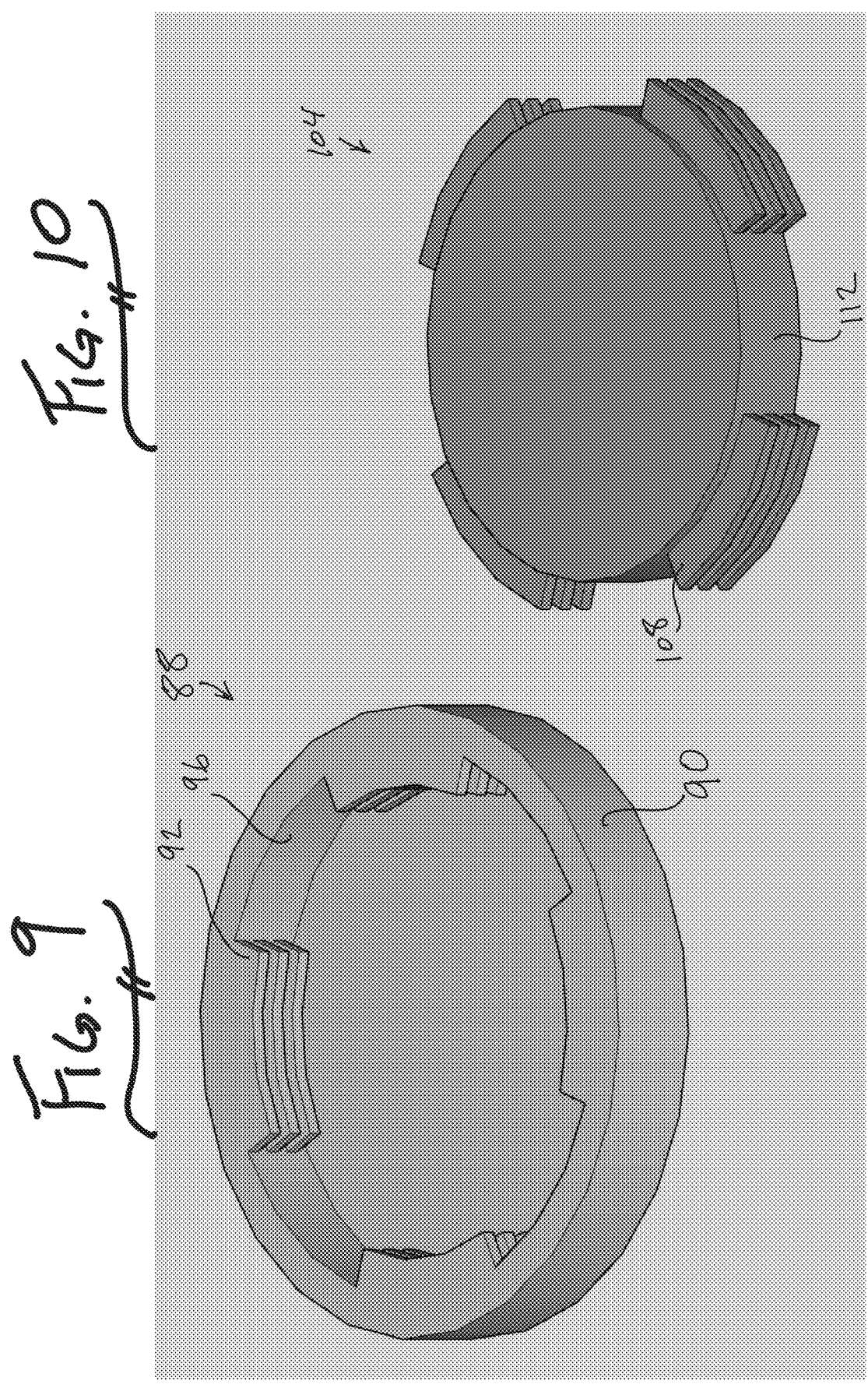

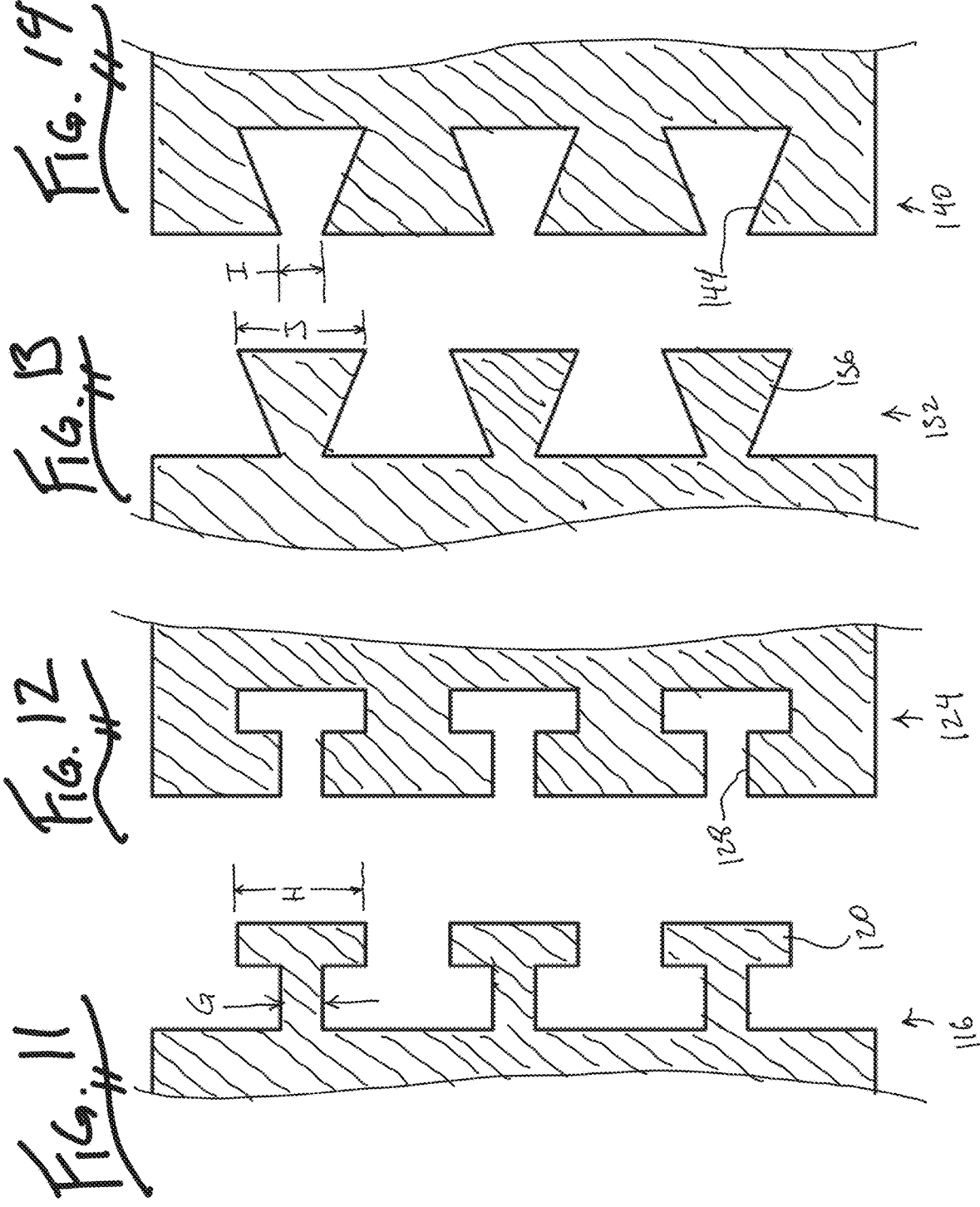

154

150

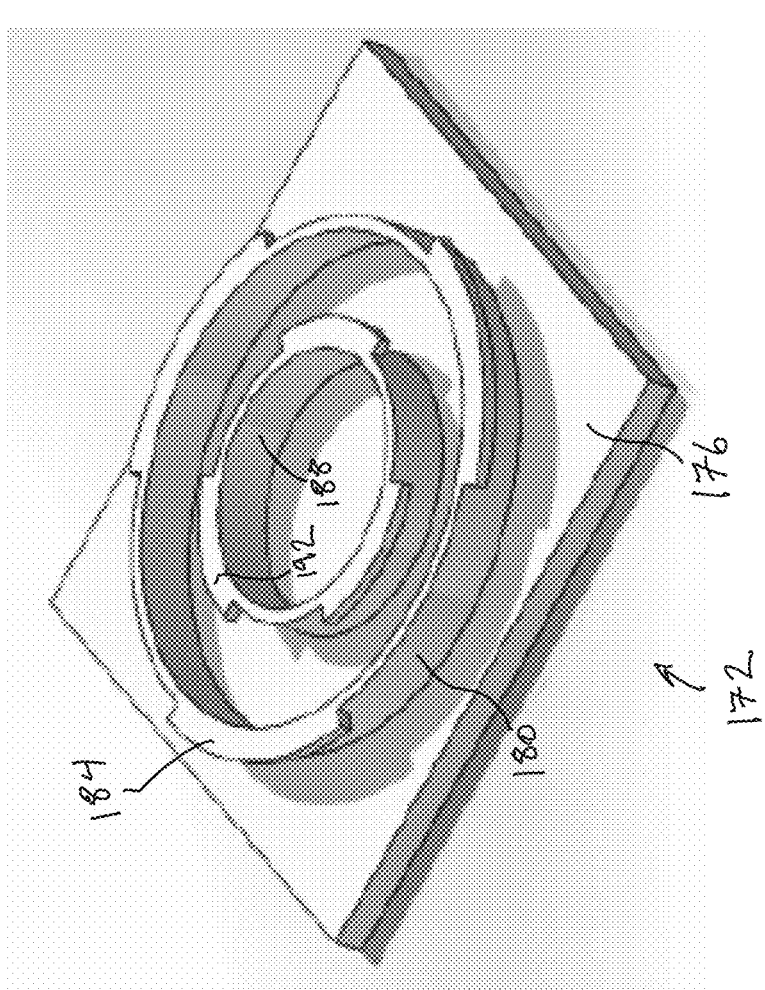
Fig. 17
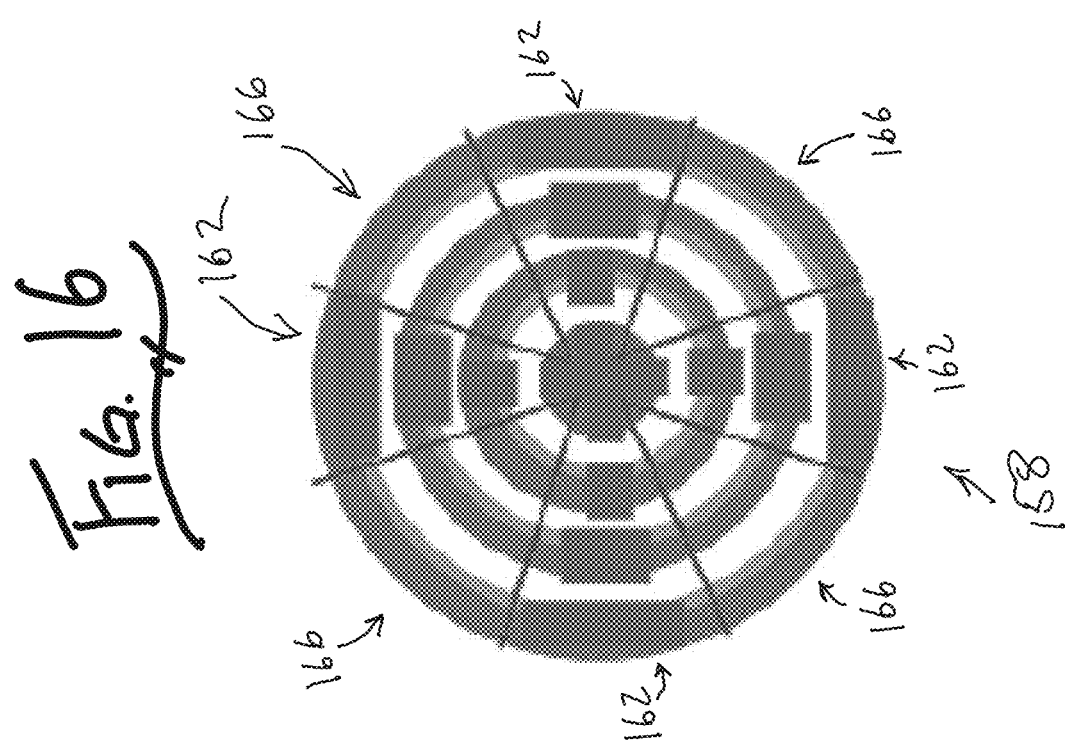
Fig. 16

BAYONET COUPLER AND VEHICLE OCCUPANT RESTRAINT SYSTEM FOR USE THEREIN

CROSS-REFERENCE TO RELATED APPLICATIONS

This application claims the benefit of U.S. Provisional Patent Application No. 63/400,509 filed on Aug. 24, 2022, the entire contents of which are incorporated herein by reference.

BACKGROUND

This disclosure relates to vehicle restraint systems. More specifically, this disclosure relates to shoulder seat straps.

SUMMARY

Various implementations include a bayonet connector device including a female coupler including an annular wall defining a female coupler opening and a central axis, and a plurality of female coupler engagement structures extending radially inward from the annular wall toward the central axis, and a male coupler sized to be received within the female coupler opening and including a plurality of male coupler engagement structures shaped to mesh with the female coupler engagement structures. The female coupler engagement structures and the male coupler engagement structures define an inner length in an axial direction parallel with the central axis, and an outer length in the axial direction at a position radially farther away from the central axis than the inner length. The outer length is greater than the inner length.

Various implementations include a system for restraining an occupant in a vehicle. The system includes a first webbing configured to extend across a first shoulder of the occupant and over a torso of the occupant, a second webbing configured to extend over a second shoulder of the occupant, a first coupler coupled to the first webbing, defining a central axis, and including a plurality of first coupler engagement structures extending radially relative to the central axis, and a second coupler coupled to the second webbing and including a plurality of second coupler engagement structures shaped to mesh with the first coupler engagement structures. The first coupler engagement structures and the second coupler engagement structures define an inner length in an axial direction parallel with the central axis, and an outer length in the axial direction at a position radially farther away from the central axis than the inner length, the outer length greater than the inner length. The second coupler is couplable to the first coupler along an anterior side of the torso of the occupant.

Various implementations include a system for restraining an occupant in a vehicle. The system includes a first webbing configured to extend across a first shoulder of the occupant and over a torso of the occupant, a second webbing configured to extend over a second shoulder of the occupant, a first coupler coupled to and slidable along the first webbing, and including a plurality of first coupler engagement structures, and a second coupler coupled to the second webbing and including a plurality of second coupler engagement structures shaped to engage the first coupler engagement structures.

Various implementations include a bayonet connector device. The device includes a female coupler portion and a male coupler portion. The female coupler portion has an annular shape defining an opening and an inner surface. The male coupler portion has an outer surface shaped such that the male coupler portion can be disposed within the opening of the female coupler portion. One of the inner surface of the female coupler portion or the outer surface of the male coupler portion defines one or more circumferentially extending grooves. Each of the one or more grooves has a radially inward portion and a radially outward portion located radially outwardly from the radially inward portion. The radially inward portion of the groove has a radially inward width as measured in an axial direction, and the radially outward portion of the groove has a radially outward width as measured in the axial direction. The radially outward width is larger than the radially inward width. Another of the outer surface of the male coupler portion or the inner surface of the female coupler portion includes one or more circumferentially extending protrusions. Each of the one or more protrusions is shaped to be disposed within one of the one or more grooves.

In some implementations, a cross-section of the one or more grooves, as viewed in a circumferential direction, is T-shaped. In some implementations, a cross-section of the one or more protrusions, as viewed in a circumferential direction, is T-shaped.

In some implementations, a cross-section of the one or more groove, as viewed in a circumferential direction, is dovetail-shaped. In some implementations, a cross-section of the one or more protrusion, as viewed in a circumferential direction, is dovetail-shaped.

In some implementations, the one or more grooves extend partially around a circumference of the one of the inner surface of the female coupler portion or the outer surface of the male coupler portion. In some implementations, the one or more grooves are a first set of one or more grooves, and the device further includes a second set of one or more grooves circumferentially spaced apart from the first set of one or more grooves.

In some implementations, the one or more protrusions extend partially around a circumference of the another of the outer surface of the male coupler portion or the inner surface of the female coupler portion. In some implementations, the one or more protrusions are a first set of one or more protrusions, and the device further includes a second set of one or more protrusions circumferentially spaced apart from the first set of one or more protrusions.

In some implementations, the one or more grooves do not extend in the axial direction. In some implementations, the one or more protrusions do not extend in the axial direction.

In some implementations, when the male coupler portion is disposed within the opening of the female coupler portion, rotation of the male coupler portion or the female coupler portion in a circumferential direction couples the male coupler portion to the female coupler portion.

In some implementations, the female coupler portion includes the one or more grooves, and the male coupler portion includes the one or more protrusions.

Various other implementations include a system for restraining an occupant in a vehicle. The system includes a first webbing, a second webbing, a first coupler portion, and a second coupler portion. The first webbing is configured to extend across a first shoulder of the occupant and over a torso of the occupant. The first coupler portion is coupled to a portion of the first webbing. The second webbing has a first portion and a second portion spaced longitudinally apart from the first portion. The second webbing is configured to extend over a second shoulder of the occupant. The second coupler portion is coupled to the second portion of the second webbing. The second coupler is couplable to the first coupler portion along an anterior side of the torso of the occupant.

In some implementations, one of the first coupler portion or the second coupler portion defines one or more openings, and another of the second coupler portion and the first coupler portion includes one or more protrusions that are disposable within the one or more openings to couple the first coupler portion to the second coupler portion.

In some implementations, the another of the second coupler portion or the first coupler portion is movable from a disengaged position to an engaged position. When the one or more protrusions are disposed within the one or more openings, the first coupler portion is uncoupled from the second coupler portion in the disengaged position and the first coupler portion is coupled to the second coupler portion in the engaged position.

In some implementations, the one of the second coupler portion or the first coupler portion is movable from a disengaged position to an engaged position. When the one or more protrusions are disposed within the one or more openings, the first coupler portion is uncoupled from the second coupler portion in the disengaged position and the first coupler portion is coupled to the second coupler portion in the engaged position.

In some implementations, the one or more protrusions include one or more mushroom-shaped protrusions. Each of the one or more mushroom-shaped protrusions include a deformable head that acts as a barb when inserted into one of the one or more openings.

In some implementations, the another of the second coupler portion or the first coupler portion is movable from a disengaged position to an engaged position. When the one or more mushroom-shaped protrusions are disposed within the one or more openings, the first coupler portion is uncoupled from the second coupler portion in the disengaged position and the first coupler portion is coupled to the second coupler portion in the engaged position.

In some implementations, the one of the second coupler portion or the first coupler portion is movable from a disengaged position to an engaged position. When the one or more mushroom-shaped protrusions are disposed within the one or more openings, the first coupler portion is uncoupled from the second coupler portion in the disengaged position and the first coupler portion is coupled to the second coupler portion in the engaged position.

In some implementations, the one or more protrusions include one or more male bayonet coupler portions, and wherein the one or more openings include one or more female bayonet coupler portions.

In some implementations, when the one or more male bayonet coupler portions are disposed within the one or more female bayonet coupler portions, rotation of the one or more male bayonet coupler portions or the one or more female bayonet coupler portions couples the first coupler portion to the second coupler portion.

In some implementations, one of the one or more male bayonet portions and one of the one or more female bayonet portions combine to form the bayonet connector device described above.

In some implementations, the first coupler portion and the second coupler portion include hook-and-loop fasteners. In some implementations, the first coupler portion and the second coupler portion include gecko-inspired fibrillar adhesion. In some implementations, the first coupler portion and the second coupler portion include gecko-inspired non-fibrillar adhesion.

In some implementations, the first coupler portion is longitudinally slidable along the portion of the first webbing. In some implementations, the first coupler portion is fixably coupled to the portion of the first webbing.

In some implementations, the system further includes a tongue slidably coupled to the first webbing. In some implementations, the system further includes a buckle. The tongue is couplable to the buckle.

In some implementations, the system further includes a first retractor coupled to the first webbing. In some implementations, the system further includes a second retractor coupled to the second webbing.

In some implementations, the first webbing is further configured to extend across a waist of the occupant.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF DRAWINGS

The device is explained in even greater detail in the following drawings. The drawings are merely exemplary and certain features may be used singularly or in combination with other features. The drawings are not necessarily drawn to scale.

FIG. 7 is a top view of a female bayonet, according to some implementations.

FIG. 8 is a top view of a male bayonet, according to some implementations.

FIG. 9 is a perspective view of the female bayonet of FIG. 7, according to some implementations.

FIG. 10 is a perspective view of the male bayonet of FIG. 8, according to some implementations.

FIG. 11 is a section view of the male bayonet of FIG. 8, according to some implementations.

FIG. 12 is a section view of the female bayonet of FIG. 7, according to some implementations.

FIG. 13 is a section view of the male bayonet of FIG. 8, according to some implementations.

FIG. 14 is a section view of the female bayonet of FIG. 7, according to some implementations.

FIG. 16 is a schematic view of a concentric coupler, according to some implementations.

FIG. 17 is a perspective view of a concentric bayonet coupler, according to some implementations.

DETAILED DESCRIPTION

Following below are more detailed descriptions of concepts related to, and implementations of, apparatuses and systems for restraining an occupant in a vehicle. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

A bayonet style mount is provided for attaching together vehicle safety components such as seat belts or straps and air bags. Specifically, apparatuses and system disclosed herein provide a low-profile mechanism for attaching together a shoulder seat belt to a three-point seat belt. Male and female parts of the bayonet mount with a low profile are installed on different parts of the seat belts to be joined and be manually or automatically latched and unlatched to connect or release the two seat belts.

The devices and systems disclosed herein provide a connector that inhibits failure in a shear direction by providing an improved contact between the male and female portions of a bayonet connection. For example, a dovetail or T-joint shape bayonet connection provides for efficient locking and improved durability. The devices and systems disclosed herein provide for efficient locking in shear and axial directions and reduce the chance of connector failure.

The devices and systems disclosed herein provide for a new 3.5 point vehicle occupant restraint system having modified profiles that increase load bearing area in a collision. This has the effect of reducing stresses and the likelihood of failure.

Figure 1:
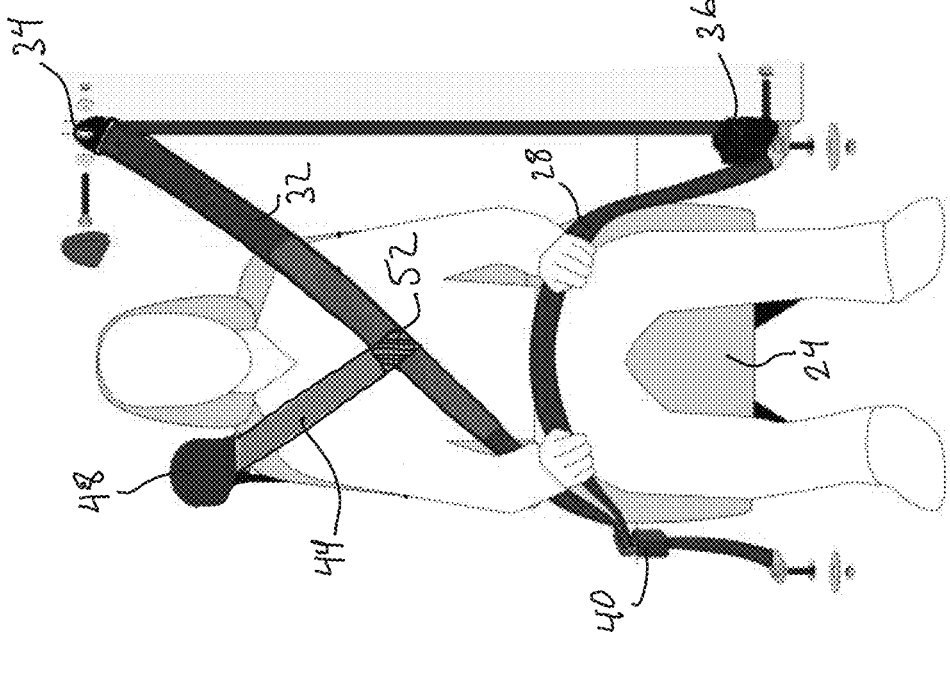
FIG. 1 is a schematic representation of a restraint system, according to some implementations.

As shown in FIG. 1, a 3.5 point vehicle occupant restraint system 20 for a vehicle includes a seat 24, a lap belt 28 sized to pass over a occupant's lap and restrain the user to the seat 24, a first webbing or shoulder strap 32 configured to extend across a first shoulder of the occupant and over a torso of the occupant, an upper mount 34 supporting the first shoulder strap 32, a first retractor 36 configured to retract and pay-out the first shoulder strap 32, and a buckle 40 releasably anchoring the lap belt 28 and the first shoulder strap 32. A second webbing of shoulder strap 44 is configured to extend over a second shoulder of the occupant and is retractable by a second retractor 48. A connector in the form of a bayonet connector device 52 releasably connects the second shoulder strap 44 to the first shoulder strap 32.

Figure 2:
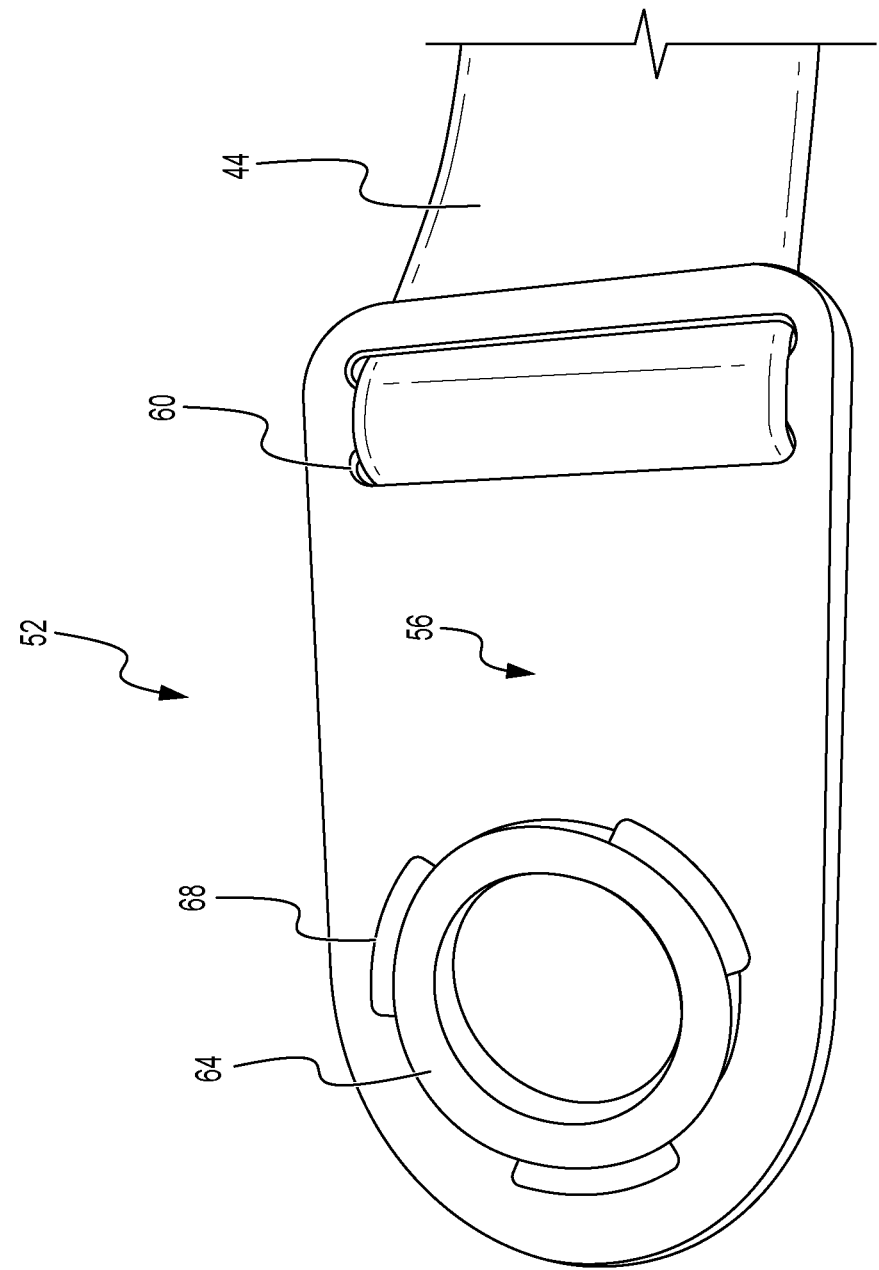
FIG. 2 is a top view of a male coupler of the restraint system of FIG. 1, according to some implementations.

As shown in FIG. 2, the bayonet connector device 52 includes a male coupler 56 that includes a strap connector in the form of a double slot 60 that connects to a distal end of the second shoulder strap 44. The male coupler 56 includes a plurality of male coupler engagement structures in the form of a male bayonet spaces 64 and male bayonet projections 68. The male coupler 56 includes three male bayonet projections 68 spaced apart from one another circumferentially by the male bayonet spaces 64.

Figure 3:
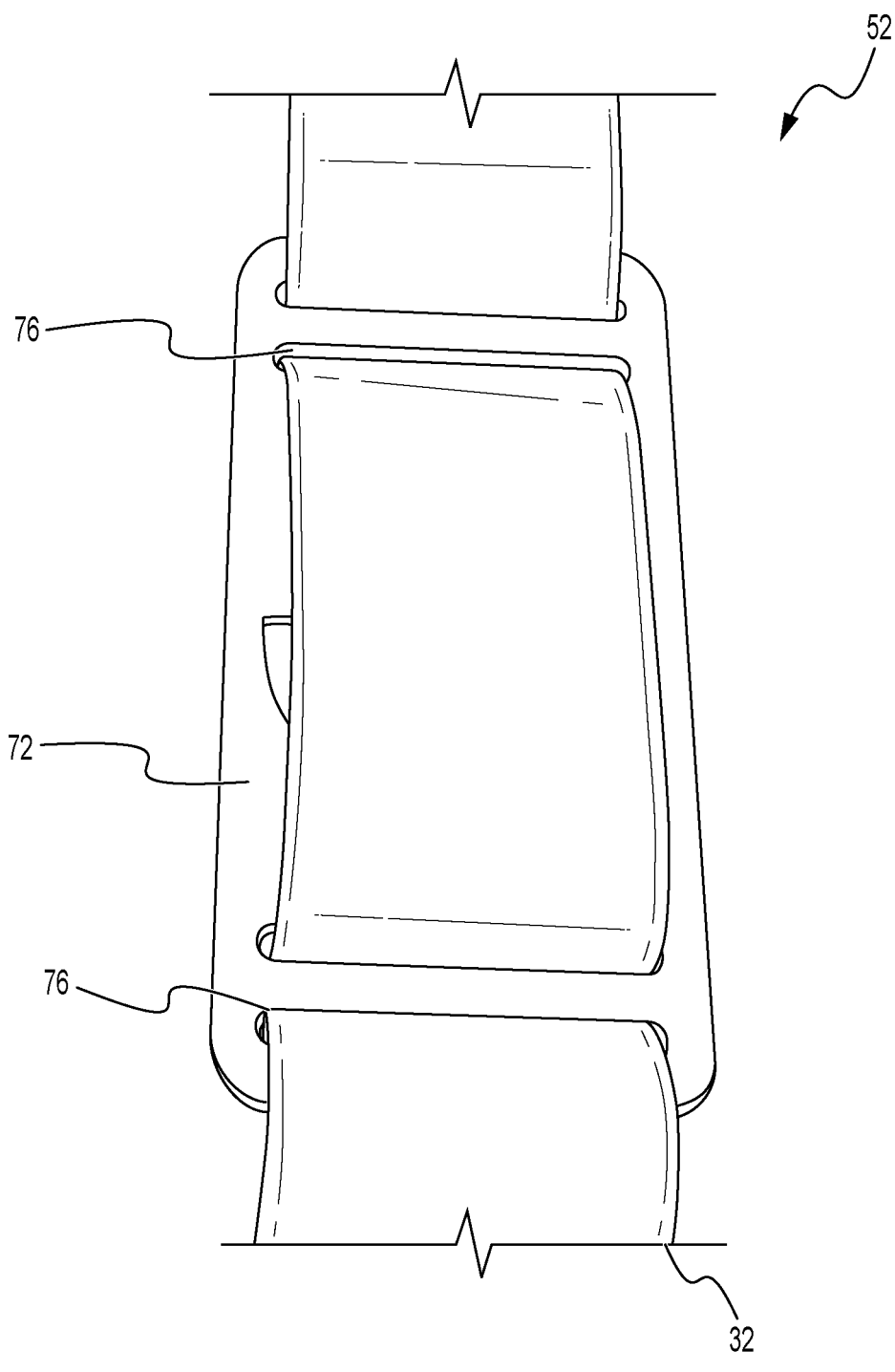
FIG. 3 is a bottom view of a female coupler of the restraint system of FIG. 1, according to some implementations.
Figure 4:
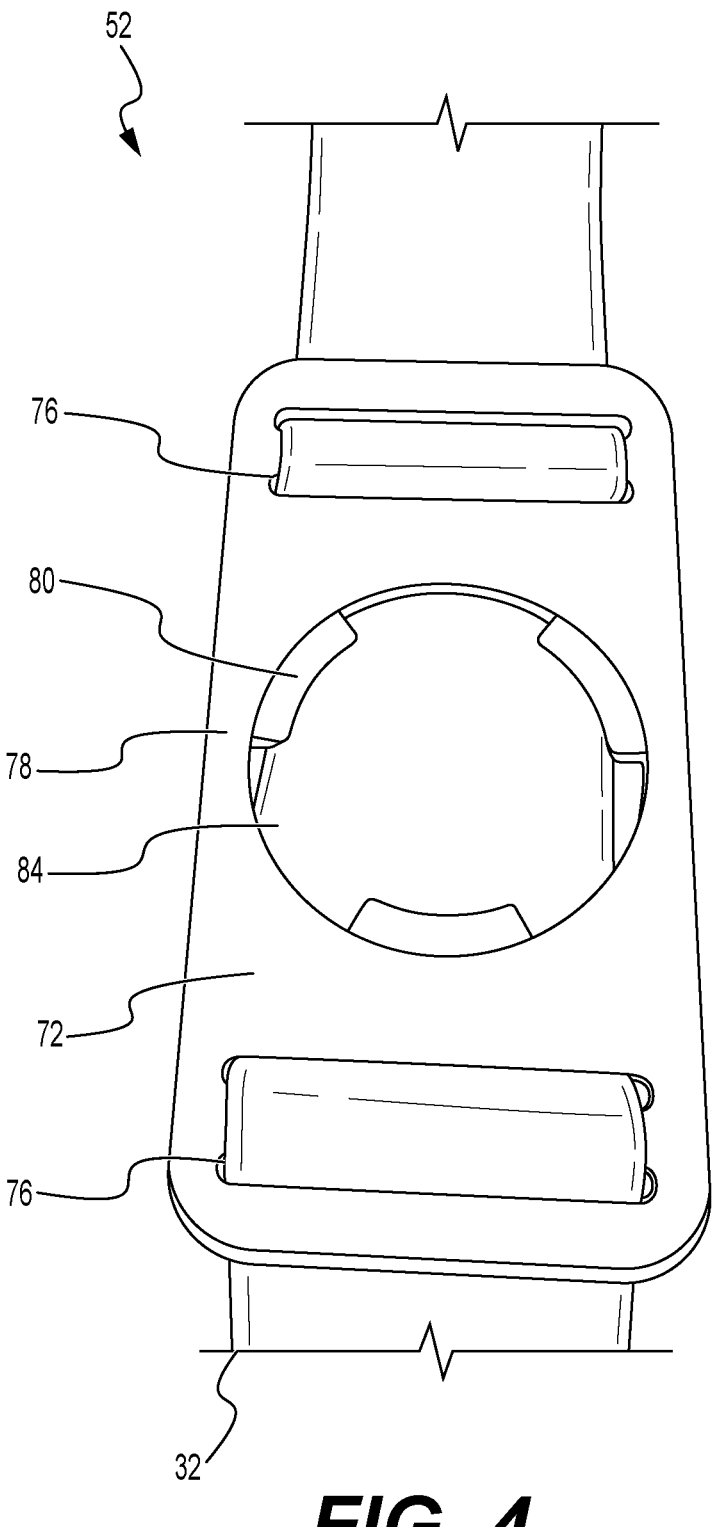
FIG. 4 is a top view of the female coupler of FIG. 3, according to some implementations.

As shown in FIGS. 3 and 4, the bayonet connector device 52 includes a female coupler 72 that includes a strap connector in the form of two double slots 76 sized to slidably engage the first shoulder strap 32. The female coupler 72 also includes an annular wall 78 defining a female coupler opening and a central axis, and a plurality of female coupler engagement structures in the form of female bayonet grooves 80 extending radially inward from the annular wall toward the central axis. The female bayonet grooves 80 are spaced apart from one another circumferentially by female bayonet spaces 84.

Figure 5:
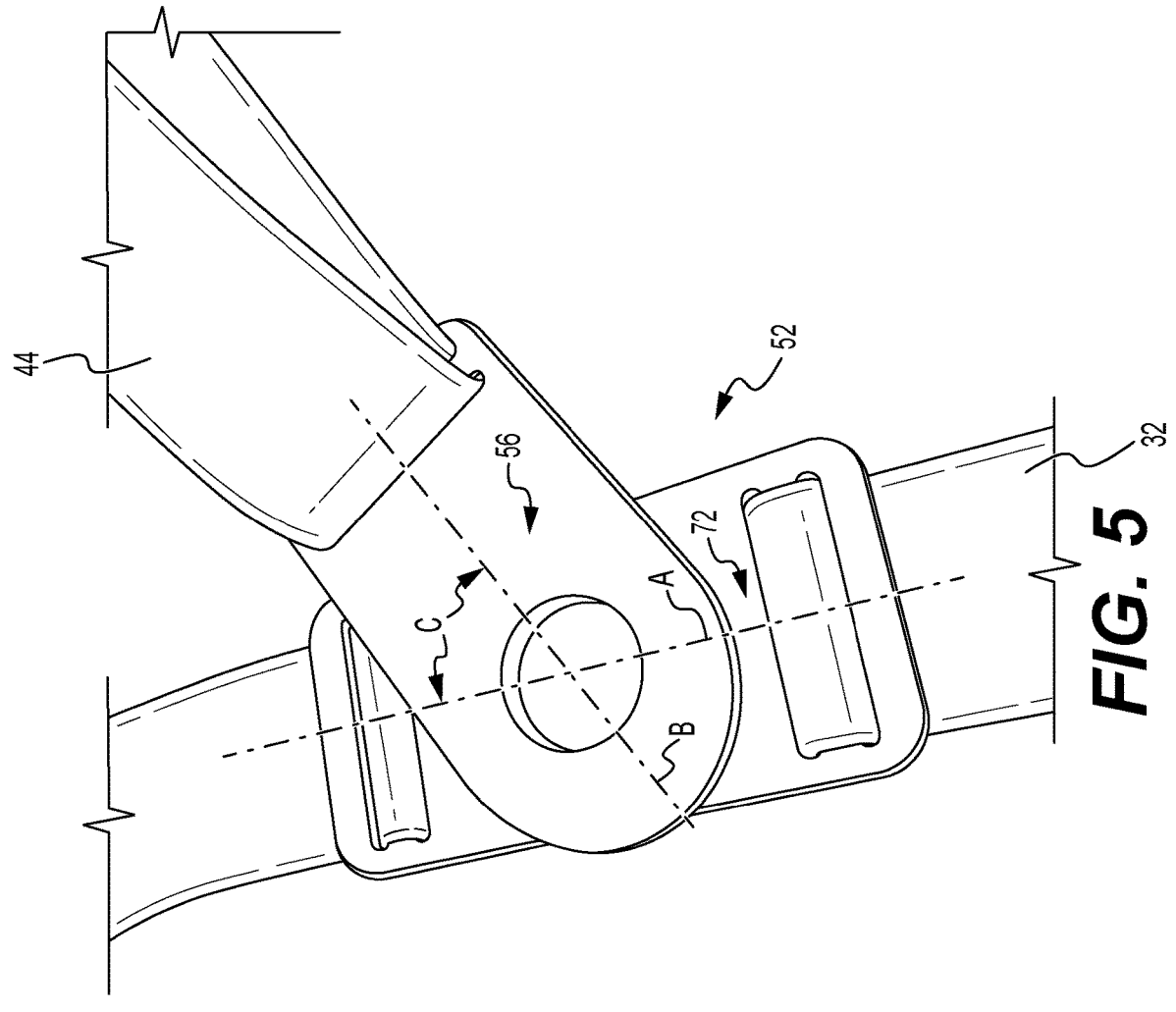
FIG. 5 is a top view of a secondary strap coupling including the male coupler of FIG. 2 and the female coupler of FIG. 4 in an unlatched position, according to some implementations.

As shown in FIG. 5, the bayonet connector device 52 is arranged in a disengaged position by aligning the first or male coupler 56 and the female coupler 72 along the central axis so that the male bayonet projections 68 align with the female bayonet spaces 84. In some implementations, the female coupler 72 defines a female longitudinal axis A, and the male coupler 56 longitudinal axis B. In the disengaged position, the female longitudinal axis A is arranged at a disengaged angle C. In some implementations, the disengaged angle C is 65 degrees. In some implementations, the disengaged angle C is 45 degrees to 85 degrees. In the disengaged position, the male coupler 56 can be inserted into the central opening of the female coupler 72 along the central axis. In some implementations, the male coupler 56 and/or the female coupler 72 includes a locating feature that aligns the male bayonet projections 68 with the female bayonet grooves 80 along the central axis.

Figure 6:
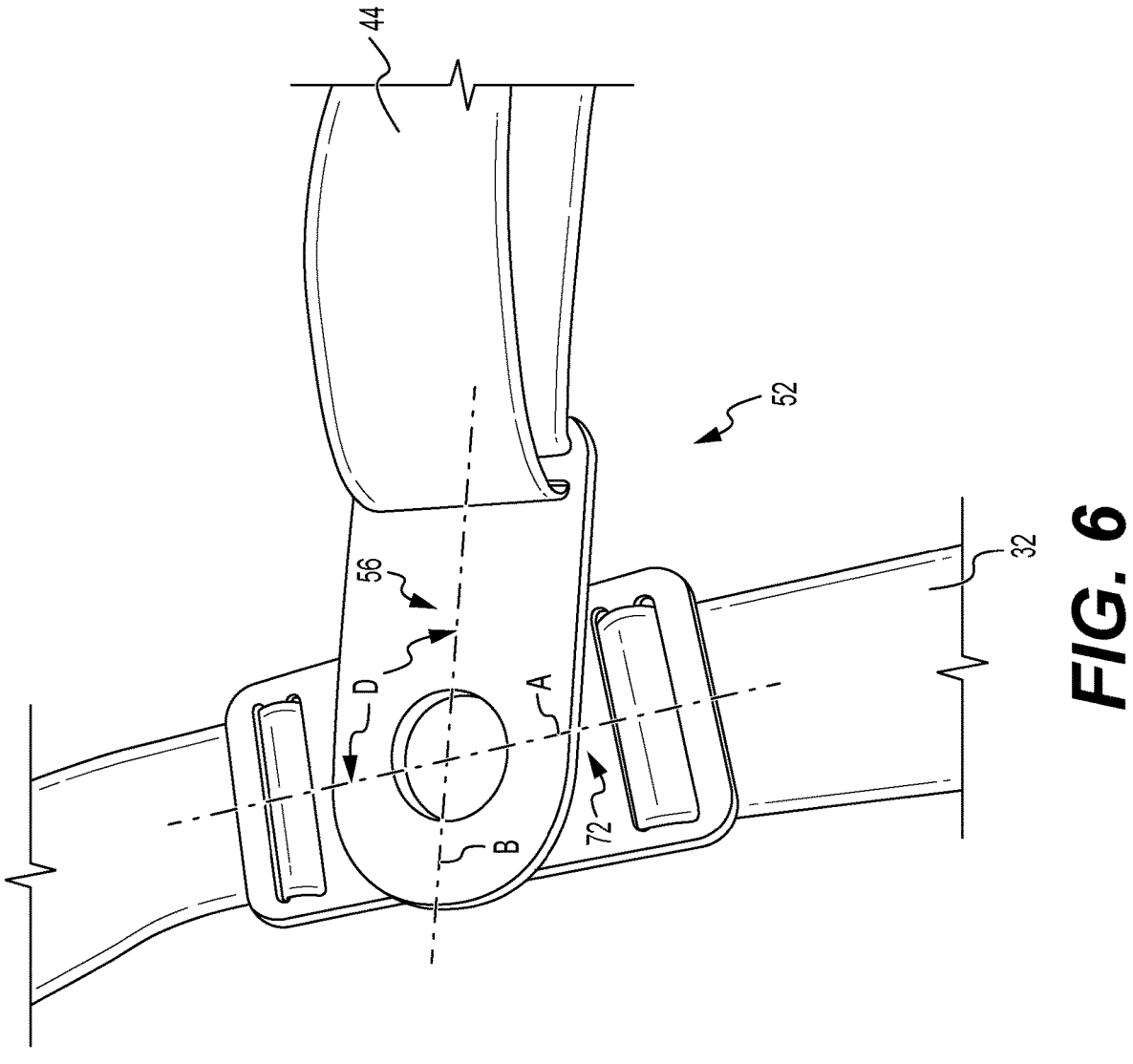
FIG. 6 is a top view of the secondary strap coupling of FIG. 5 in a latched position, according to some implementations.

As shown in FIG. 6, once the male coupler 56 is inserted into the female coupler 72, the male coupler 56 is rotated from the disengaged position to an engaged position where the male bayonet projections 68 engage the female bayonet grooves 80 and inhibit removal of the male coupler 56 from the female coupler 72 thereby holding the second shoulder strap 44 in place relative to the first shoulder strap 32 and securing the occupant in the seat 24. The male coupler 56 is rotated relative to the female coupler 72 between the disengaged position and the engaged position to an engaged angle D defined between the female longitudinal axis A and the male longitudinal axis B. In some implementations, the engaged angle is 105 degrees. In some implementations, the engaged angle D is 85 degrees to 125 degrees. In some implementations, the difference between the disengaged angle C and the engaged angle D is 40 degrees. In some implementations, the difference between the disengaged angle C and the engaged angle D is 20 degrees to 60 degrees. In some implementations, the difference between the disengaged angle C and the engaged angle D is 30 degrees to 50 degrees. In some implementations, the difference between the disengaged angle C and the engaged angle D is 10 degrees to 80 degrees.

As shown in FIG. 7, a female bayonet coupler 88 is similar to the female coupler 72 discussed above. The female bayonet coupler 88 includes an annular wall 90 defining a central opening and a central axis E. Four grooves 92 extend radially inward from the annular wall 90 toward the central axis E and are separated by four female spaces 96 interspersed between the four grooves 92 in a circumferential direction F. In some implementations, at least two of the plurality of female coupler engagement structures are aligned in the axial direction and spaced apart in the circumferential direction. In some implementations, the female bayonet coupler 88 includes a limiter or a stop 100 that engages a male coupler in the engaged position. The stop 100 can provide consistent operation of the bayonet connector device 52.

As shown in FIG. 8, a male bayonet coupler 104 is similar to the male coupler 56 discussed above and in cooperation with the female bayonet coupler 88. The male bayonet coupler 104 includes four male coupler engagement features in the form of four projections 108 spaced apart from one another by male spaces 112. The four projections 108 are sized to pass through the four female spaces 96 of the female bayonet coupler 88 and selectively engage the four grooves 92 of the female bayonet coupler 88. In some implementations, the male bayonet coupler 104 includes a stop that engages the stop 100 of the female bayonet coupler 88. In some implementations, one or more of the four projections 108 engage the stop 100 of the female bayonet coupler 88.

As shown in FIG. 9, the female bayonet coupler 88 can include four sets of female coupler engagement structures. Each set of female coupler engagement structures is spaced apart from an adjacent set of female coupler engagement structures circumferentially by a female space 96. Each set of female coupler engagement structures includes three grooves 92 that are each spaced apart from one another in an axial direction. Each groove 92 of a set of female coupler engagement structures is aligned circumferentially.

As shown in FIG. 10, the male bayonet coupler 104 can include four sets of male coupler engagement structures. Each set of male coupler engagement structures is spaced apart from an adjacent set of male coupler engagement structures circumferentially by a male space 112. Each set of male coupler engagement structures includes three projections 108 that are each spaced apart from one another in an axial direction. Each four projections 108 of a set of male coupler engagement structures is aligned circumferentially.

The male bayonet coupler 104 is shaped so that the projections 108 pass through the female spaces 96 and can be rotated into engagement with the grooves 92 of the female bayonet coupler 88.

As shown in FIG. 11, the projections 108 of the male bayonet coupler 104 can define a T-shaped profile 116 in a radial cross-section. Each T-shaped profile 116 includes a head 120. Each projection 108 defines a male inner length G in an axial direction parallel with the central axis, and a male outer length H in the axial direction at a position radially farther away from the central axis than the male inner length G. The male outer length H is greater than the male inner length G.

As shown in FIG. 12, the grooves 92 of the female bayonet coupler 88 can define a T-shaped profile 124 in a radial cross-section that cooperates with the T-shaped profile 116 of the male bayonet coupler 104. Each T-shaped profile 124 defines a female inner length G in an axial direction parallel with the central axis, and a female outer length H in the axial direction at a position radially farther away from the central axis than the male inner length G. The female outer length H is greater than the female inner length G.

As shown in FIG. 13, the projections 108 of the male bayonet coupler 104 can define a dovetail-shaped profile 132 in a radial cross-section. Each dovetail-shaped profile 132 includes a head 136. Each projection 108 defines a male inner length I in an axial direction parallel with the central axis, and a male outer length J in the axial direction at a position radially farther away from the central axis than the male inner length I. The male outer length J is greater than the male inner length I.

As shown in FIG. 14, the grooves 92 of the female bayonet coupler 88 can define a dovetail-shaped profile 140 in a radial cross-section that cooperates with the dovetail-shaped profile 132 of the male bayonet coupler 104. Each dovetail-shaped profile 140 defines a female inner length I in an axial direction parallel with the central axis, and a female outer length J in the axial direction at a position radially farther away from the central axis than the male inner length I. The female outer length J is greater than the female inner length I.

Figure 15B:
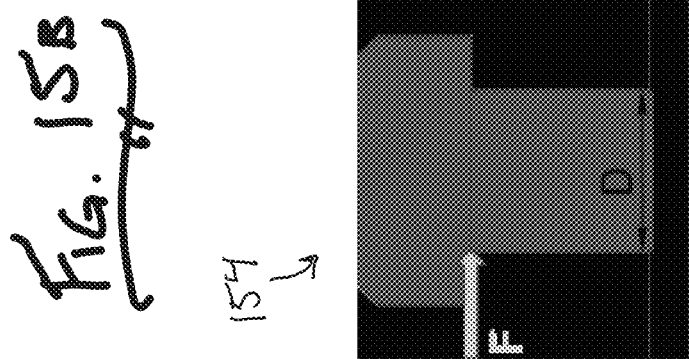
FIG. 15B is a front view of a mushroom-shaped projection, according to some implementations.
Figure 15A:
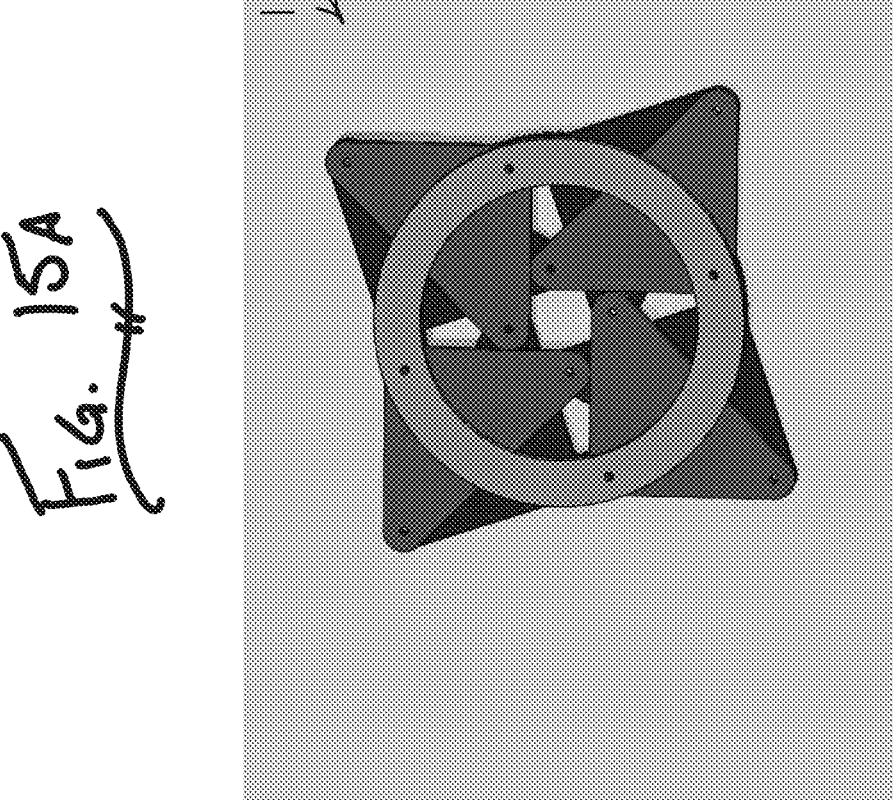
FIG. 15A is a top view of a mushroom coupler device for use with the restraint system of FIG. 1

As shown in FIGS. 15A and 15B, the bayonet connections discussed above can be replaced with a mushroom coupling including an opening 150 and a mushroom-shaped projection 154. In some implementations, the opening 150 is actuatable between an opening position defining a first opening diameter and a closed position defining a second opening diameter that is smaller than the first opening diameter. The second opening diameter is sized to engage a head of the mushroom-shaped projection 154 and inhibit the separation of a first coupler from a second coupler. In some implementations, the opening 150 is actuatable via rotation (e.g., rotating a housing or grip of the opening 150 actuates the coupler from an open arrangement to a closed arrangement). In some implementations, the opening is biased toward the second opening diameter by a spring or other biassing mechanism.

As shown in FIG. 16, a concentric coupler 158 includes four concentric engagement zones 162 spaced apart from each other circumferentially by spaces 166. Similar to the implementations discussed above, a male coupler can be received axially within the spaces 166 then rotated into an engaged position about a central axis so that the engagement zones 162 of a male coupler and a female coupler are engaged and the concentric coupler 158 is held together. The concentric coupler 158 includes four concentric engagement zones 162. In some implementations, the concentric coupler 158 includes two, three, or more than four concentric engagement zones 162. In some implementations, the cross section of the concentric engagement zones 162 are T-shaped, dovetail-shaped, L-shaped, or another shape including a male-female engagement interface.

As shown in FIG. 17, a concentric coupler 172 includes a base 176, a first wall 180 extending from the base 176 and including first projections 184, and a second wall 188 extending from the base 176 and including second projections 192. The concentric coupler 172 is structured to engage a corresponding concentric coupler. The concentric coupler 172 include three first projections 184 and three second projections 192. In some implementations, the concentric coupler 172 includes more than three or less than three first projections 184, and more than three or less than three second projections 192. In some implementations, the number of first projections 184 is different than the number of second projections 192. The first wall 180 and the second wall 188 each define a wall high from the base 176. In the implementation shown in FIG. 17, the wall heights of the first wall 180 and the second wall 188 are equal. In some implementations, the wall heights of the first wall 180 and the second wall 188 are different. For example, the first wall 180 may be taller than the second wall 188. While one layer of first projections 184 and second projections 192 are shown in FIG. 17, some implementations include a plurality of first projections 184 and/or second projections 192 aligned circumferentially and spaced apart axially similar to the implementations discussed above with respect to FIGS. 11-14.

Figure 18:
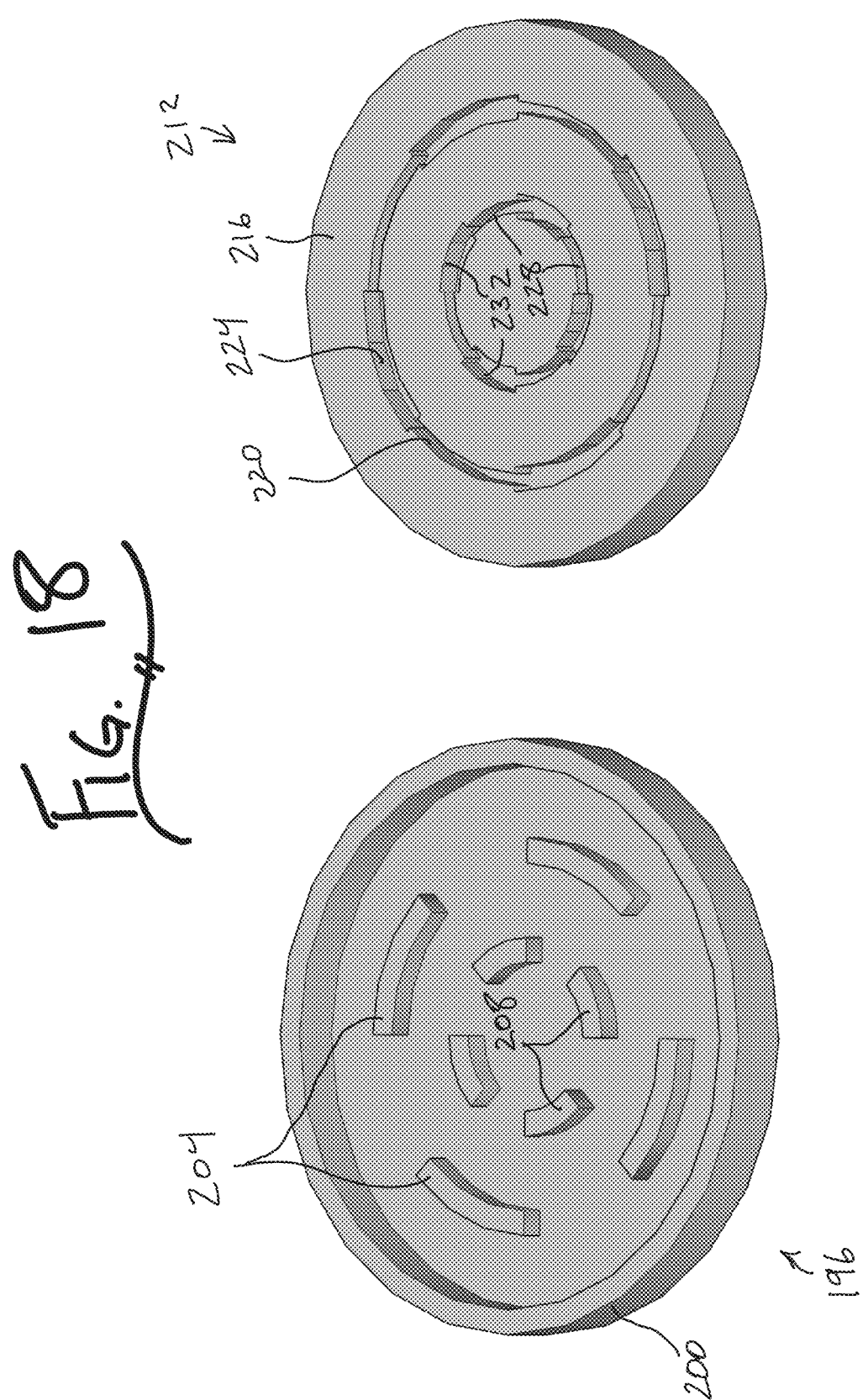
FIG. 18 is a perspective view of another concentric bayonet coupler, according to some implementations.

As shown in FIG. 18, a male concentric coupler 196 includes an annular outer wall 200, an outer row of projections 204 and an inner row of projections 208. The outer projections 204 and the inner projections 208 may define a T-shaped or dovetail-shaped cross-sectional profile as discussed above, or may define another captured shape. A female concentric coupler 212 is sized to be received within the annular outer wall 200 of the male concentric coupler 196 and includes outer grooves 220 that are spaced concentrically by outer spaces 224. The outer grooves 220 are sized to selectively engage the outer projections 204 and the outer spaces 224 are sized to freely receive the outer projections 204. The female concentric coupler 212 also includes inner grooves 228 that are spaced concentrically by inner spaces 232. The inner grooves 228 are sized to selectively engage the inner projections 208 and the inner spaces 232 are sized to freely receive the inner projections 208. In operation, the female concentric coupler 212 is moved axially relative to the male concentric coupler 196 with the inner projections 208 aligned with the inner spaces 232 and the outer projections 204 aligned with the outer spaces 224. Once the female concentric coupler 212 is received within the male concentric coupler 196, the female concentric coupler 212 and the male concentric coupler 196 are rotated relative to one another and the outer projections 204 are engaged with the outer grooves 220, and the inner projections 208 are engaged with the inner grooves 228 to inhibit removal of the female concentric coupler 212 from the male concentric coupler 196 in the axial direction.

Figure 19:
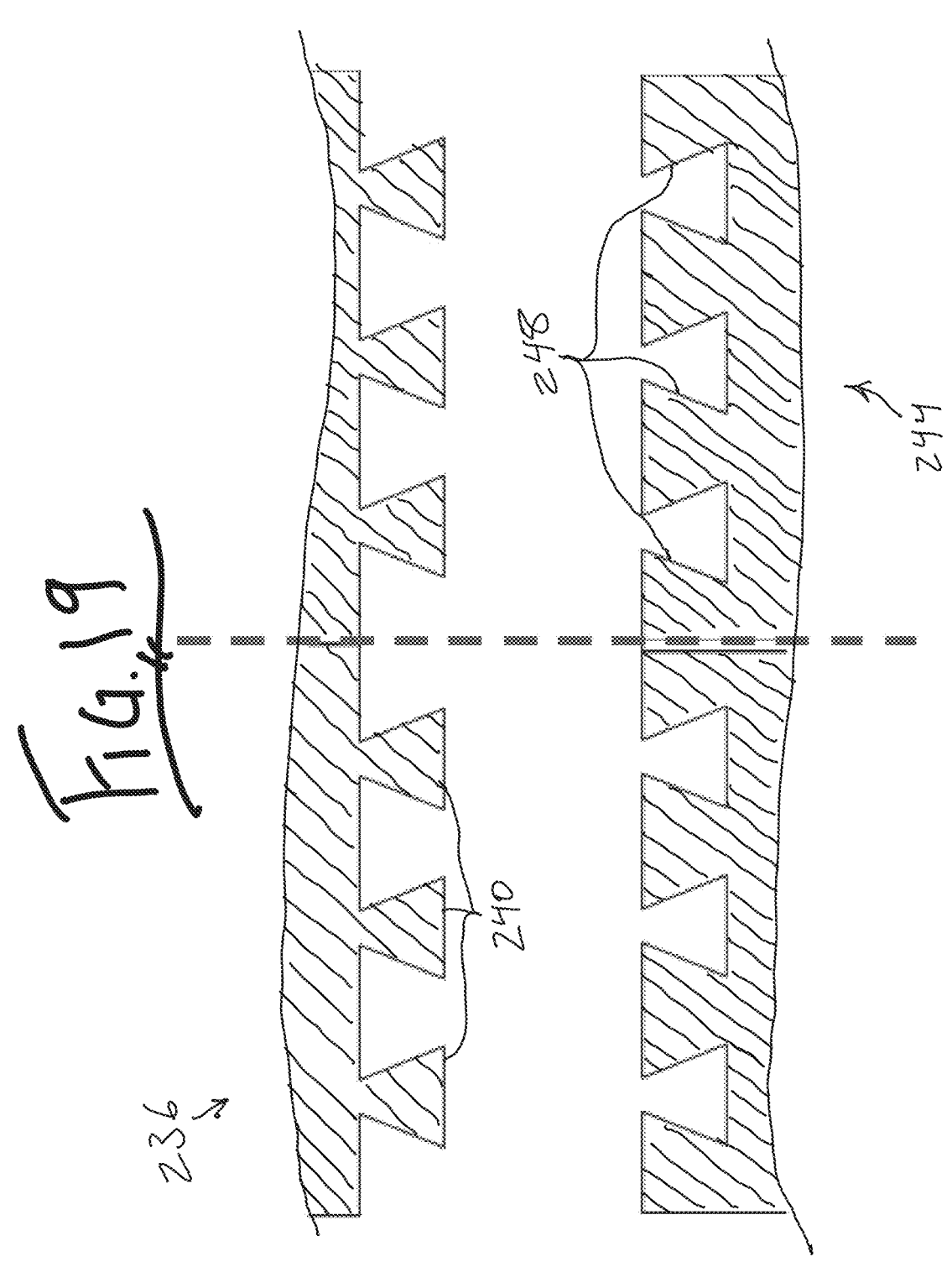
FIG. 19 is a sectional view of a concentric coupler, according to some implementations.

As shown in FIG. 19, a male concentric coupler 236 similar to the male concentric coupler 196 includes dovetail-shaped projections 240. A female concentric coupler 244 similar to the female concentric coupler 212 includes dovetail-shaped grooves 248 that correspond to the spacing and shape of the dovetail-shaped projections 240 about a central axis. Once the male concentric coupler 236 is axially inserted in the openings (not shown) of the female concentric coupler 244, the rotation of the male concentric coupler 236 relative to the female concentric coupler 244 engages the dovetail-shaped projections 240 with the female concentric coupler 244 and inhibits removal of the male concentric coupler 236 from the female concentric coupler 244 axially.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

For purposes of this description, certain advantages and novel features of the aspects and configurations of this disclosure are described herein. The described methods, systems, and apparatus should not be construed as limiting in any way. Instead, the present disclosure is directed toward all novel and nonobvious features and aspects of the various disclosed aspects, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved. For example, the implementations of FIGS. 9 and 10 may be combined with the implementations of FIG. 18 to provide a concentric coupler with a plurality of stacked projections and grooves.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Features disclosed in this specification (including any accompanying claims, abstract, and drawings), and/or all of the steps of any method or process so disclosed, may be combined in any combination, except combinations where at least some of such features and/or steps are mutually exclusive. The claimed features extend to any novel one, or any novel combination, of the features disclosed in this specification (including any accompanying claims, abstract, and drawings), or to any novel one, or any novel combination, of the steps of any method or process so disclosed.

As used in the specification and the appended claims, the singular forms "a", "an", and "the" include plural referents unless the context clearly dictates otherwise. Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about", it will be understood that the particular value forms another aspect. It will be further understood that the endpoints of each of the ranges are significant both in relation to the other endpoint, and independently of the other endpoint. The terms "about" and "approximately" are defined as being "close to" as understood by one of ordinary skill in the art. In one non-limiting aspect the terms are defined to be within 10%. In another non-limiting aspect, the terms are defined to be within 5%. In still another non-limiting aspect, the terms are defined to be within 1%.

The terms "coupled", "connected", and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

Certain terminology is used in the following description for convenience only and is not limiting. The words "right", "left", "lower", and "upper" designate direction in the drawings to which reference is made. The words "inner" and "outer" refer to directions toward and away from, respectively, the geometric center of the described feature or device. The words "distal" and "proximal" refer to directions taken in context of the item described and, with regard to the instruments herein described, are typically based on the perspective of the practitioner using such instrument, with "proximal" indicating a position closer to the practitioner and "distal" indicating a position further from the practitioner. The terminology includes the above-listed words, derivatives thereof, and words of similar import.

Throughout the description and claims of this specification, the word "comprise" and variations of the word, such as "comprising" and "comprises", means "including but not limited to", and is not intended to exclude, for example, other additives, components, integers or steps. "Exemplary" means "an example of" and is not intended to convey an indication of a preferred or ideal aspect. "Such as" is not used in a restrictive sense, but for explanatory purposes.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A system for restraining an occupant in a vehicle, the system comprising:
a first webbing configured to extend across a first shoulder of the occupant and over a torso of the occupant;
a second webbing configured to extend over a second shoulder of the occupant;
a first coupler coupled to the first webbing, defining a central axis, and including a plurality of first coupler engagement structures extending radially relative to the central axis; and
a second coupler coupled to the second webbing and including a plurality of second coupler engagement structures shaped to mesh with the first coupler engagement structures,
wherein the first coupler engagement structures and the second coupler engagement structures define
an inner length in an axial direction parallel with the central axis, and
an outer length in the axial direction at a position radially farther away from the central axis than the inner length, the outer length greater than the inner length, and
wherein the second coupler is couplable to the first coupler along an anterior side of the torso of the occupant.

2. The system of claim 1, wherein the first coupler includes an annular wall defining a first coupler opening, and wherein the plurality of first coupler engagement structures extend radially inward from the annular wall toward the central axis.

3. The system of claim 1, wherein each of the first coupler engagement structures includes a groove and each of the second coupler engagement structures includes a projection sized to be received within a corresponding groove, and
wherein the first coupler engagement structures define a T-shaped profile or a dovetail-shaped profile in a radial cross-section.

4. The system of claim 1, wherein the second coupler rotates relative to the first coupler between an engaged position where the second coupler engagement structures engage the first coupler engagement structures, and a disengaged position where the second coupler engagement structures do not engage the first coupler engagement structures, and
wherein the engaged position is radially spaced from the disengaged position by 30 degrees to 50 degrees.

5. The system of claim 1, wherein at least two of the plurality of first coupler engagement structures are spaced apart in a radial direction.

6. The system of claim 1, wherein at least two of the plurality of first coupler engagement structures are aligned in a circumferential direction and spaced apart in the axial direction, and
wherein at least two of the plurality of first coupler engagement structures are aligned in the axial direction and spaced apart in the circumferential direction.

7. The system of claim 1, wherein the first coupler is longitudinally slidable along the first webbing.

8. A system for restraining an occupant in a vehicle, the system comprising:
a first webbing configured to extend across a first shoulder of the occupant and over a torso of the occupant;
a second webbing configured to extend over a second shoulder of the occupant;
a first coupler coupled to and slidable along the first webbing, and including a plurality of first coupler engagement structures; and
a second coupler coupled to the second webbing and including a plurality of second coupler engagement structures shaped to engage the first coupler engagement structures.

9. The system of claim 8, wherein the second coupler engagement structures include mushroom-shaped protrusions,
wherein the first coupler engagement structures include openings, and
wherein each of the mushroom-shaped protrusions includes a deformable head that acts as a barb when inserted into one of the openings.

10. The system of claim 8, wherein the first coupler is a female bayonet including a plurality of sets of grooves spaced apart from one another circumferentially, each set of grooves including a plurality of grooves spaced apart in an axial direction, and
wherein the second coupler is a male bayonet including a plurality of sets of projections spaced apart from one another circumferentially and shaped to selectively engage the plurality of sets of grooves, each set of projections including a plurality of grooves spaced apart in the axial direction.

* * * * *